US012606324B2

(12) United States Patent
Mukae

(10) Patent No.: US 12,606,324 B2
(45) Date of Patent: Apr. 21, 2026

(54) POSITIONING METHOD, LUNAR POSITIONING SYSTEM, AND POSITIONING SATELLITE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 183 days.

(21) Appl. No.: 18/684,839

(22) PCT Filed: Aug. 25, 2022

(86) PCT No.: PCT/JP2022/032122
§ 371 (c)(1),
(2) Date: Feb. 20, 2024

(87) PCT Pub. No.: WO2023/032822
PCT Pub. Date: Mar. 9, 2023

(65) Prior Publication Data
US 2025/0121962 A1 Apr. 17, 2025

(30) Foreign Application Priority Data
Aug. 30, 2021 (JP) ................................. 2021-139510

(51) Int. Cl.
*B64G 3/00* (2006.01)
*B64G 1/66* (2006.01)
(52) U.S. Cl.
CPC *B64G 3/00* (2013.01); *B64G 1/66* (2013.01)

(58) Field of Classification Search
CPC .......... B64G 3/00; B64G 1/66; B64G 1/1085; B64G 1/242; B64G 1/10; B64G 1/24
See application file for complete search history.

(56) References Cited

U.S. PATENT DOCUMENTS 4,359,733 A * 11/1982 O'Neill ................... G01S 13/78
342/36
5,909,299 A * 6/1999 Sheldon, Jr. ......... B64G 1/1085
398/172

(Continued)

FOREIGN PATENT DOCUMENTS

JP 2004-191158 A 7/2004
JP 2004-317200 A 11/2004

(Continued)

OTHER PUBLICATIONS

QZSS (Quasi Zenith Satellite System) (Year: 2012).*

(Continued)

*Primary Examiner* — Donald J Wallace
*Assistant Examiner* — Jalal C Coduroglu
(74) *Attorney, Agent, or Firm* — XSENSUS LLP

(57) ABSTRACT

A flying object flies in an outer space from the earth to the moon or a planet or near the moon or a planet. The flying object includes a positioning-signal reception device. A ground station includes a positioning-signal transmission device equipped with a directivity-direction control function and has known position coordinates in an earth-fixed coordinate system. The flying object measures position coordinates in the earth-fixed coordinate system by receiving a positioning signal transmitted from the ground station simultaneously from the ground stations at four locations.

7 Claims, 19 Drawing Sheets

(56) References Cited

U.S. PATENT DOCUMENTS

| | | | | |
|---|---|---|---|---|
| 2002/0147542 | A1* | 10/2002 | Tomescu | G01S 5/0063 |
| | | | | 342/36 |
| 2007/0046530 | A1* | 3/2007 | Fedora | G01S 5/14 |
| | | | | 342/357.22 |
| 2008/0233970 | A1* | 9/2008 | Burtner | G01S 19/09 |
| | | | | 455/427 |
| 2012/0056782 | A1* | 3/2012 | McBurney | G01S 19/27 |
| | | | | 342/357.66 |
| 2014/0136029 | A1* | 5/2014 | Nagase | B64G 1/242 |
| | | | | 701/3 |
| 2016/0377700 | A1* | 12/2016 | Englert | G01S 19/00 |
| | | | | 342/357.78 |
| 2019/0248515 | A1 | 8/2019 | Hakamada et al. | |
| 2020/0319350 | A1* | 10/2020 | Wang | G06F 17/13 |
| 2024/0402329 | A1* | 12/2024 | Moses | G01S 13/767 |

FOREIGN PATENT DOCUMENTS

| | | |
|---|---|---|
| JP | 2009-244143 A | 10/2009 |
| WO | 2018/029839 A1 | 2/2018 |

OTHER PUBLICATIONS

Multi-Constellation GNSS for Absolute and Relative Navigation in Highly Elliptical Orbits (Year: 2017).*
International Search Report and Written Opinion mailed on Nov. 15, 2022, received for PCT Application PCT/JP2022/032122, filed on Aug. 25, 2022, 17 pages including English Translation.

* cited by examiner

500:FLYING OBJECT

501
POSITIONING-SIGNAL
RECEPTION DEVICE

502
MEASURING DEVICE

Fig. 3

800:POSITIONING SYSTEM

100:GROUND STATION

70:EARTH

100

100

100

21

500

STATIONARY SATELLITE

POSITIONING-SIGNAL TRANSMISSION DEVICE

QUASI-ZENITH SATELLITE

300

10

POSITIONING-SIGNAL
TRANSMISSION DEVICE

800:POSITIONING SYSTEM

70

300

300

200

21

500:FLYING OBJECT
(INCLUDING HIGH-PRECISION CLOCK)

500 : FLYING OBJECT

501 POSITIONING-SIGNAL RECEPTION DEVICE

502 MEASURING DEVICE

503 HIGH-PRECISION CLOCK

510:FIRST FLYING OBJECT

501 POSITIONING-SIGNAL RECEPTION DEVICE

502 MEASURING DEVICE

503 HIGH-PRECISION CLOCK

10 POSITIONING-SIGNAL TRANSMISSION DEVICE

Fig. 14

550 : LUNAR SURFACE STATION

503

HIGH-PRECISION CLOCK

10

POSITIONING-SIGNAL
TRANSMISSION DEVICE

530: THIRD FLYING OBJECT

503 HIGH-PRECISION CLOCK

10 POSITIONING-SIGNAL TRANSMISSION DEVICE

Fig. 18

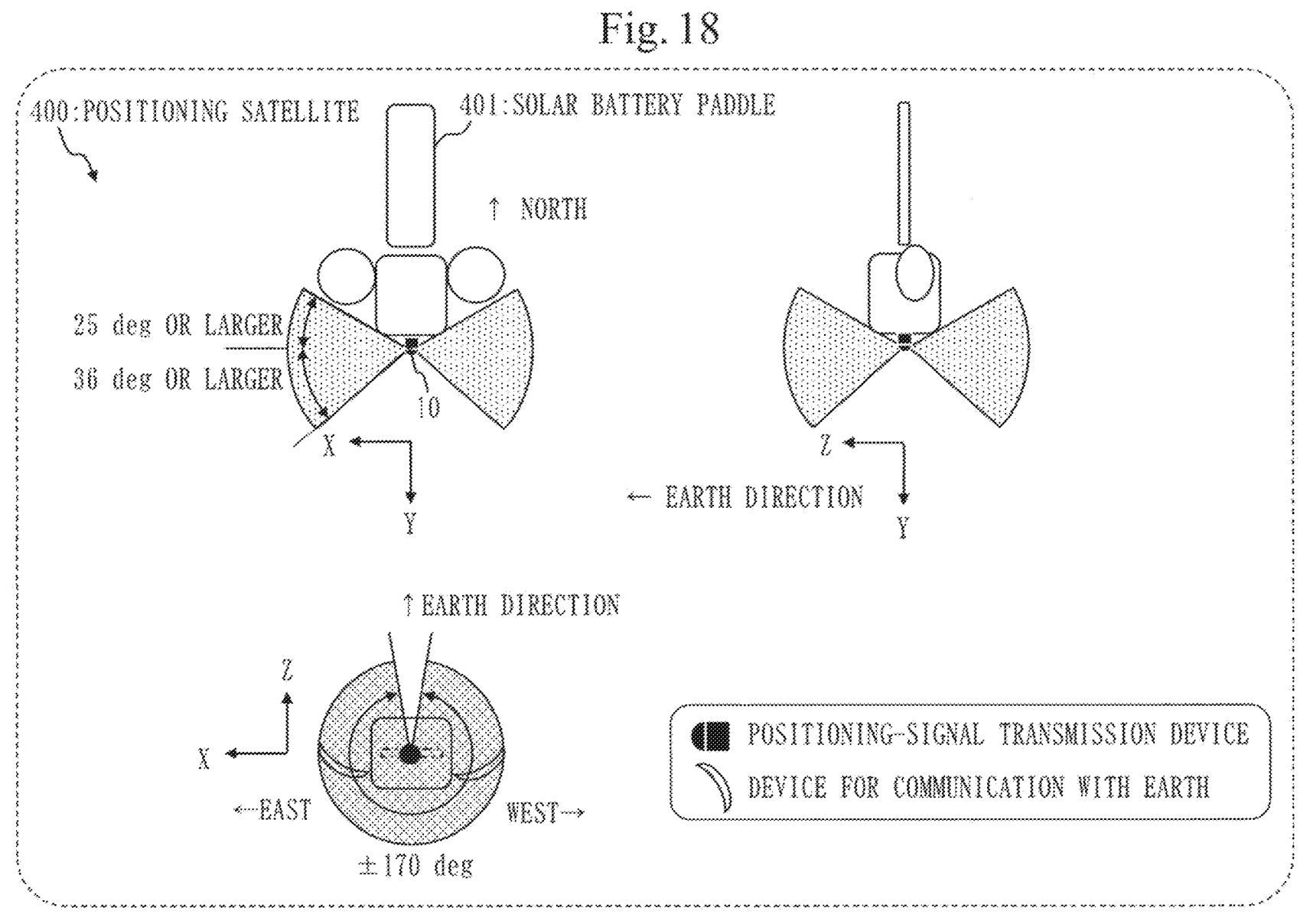

400: POSITIONING SATELLITE

401: SOLAR BATTERY PADDLE

NORTH 25 deg OR LARGER
36 deg OR LARGER

10

X

Y

EARTH DIRECTION

Z

Y

EARTH DIRECTION

WEST→

±170 deg

←EAST

Z

X

POSITIONING-SIGNAL TRANSMISSION DEVICE
DEVICE FOR COMMUNICATION WITH EARTH

CHANGE EXAMPLE OF COMMUNICATION RANGE DUE TO INCLINATION OF EARTH AXIS; CASE IN WHICH COMMUNICATION INTERRUPTION IS MINIMIZED

VIEWED FROM NORTH POLE SIDE

POSITIONING METHOD, LUNAR POSITIONING SYSTEM, AND POSITIONING SATELLITE

CROSS-REFERENCE TO RELATED APPLICATIONS

This application is based on PCT filing PCT/JP2022/032122, filed Aug. 25, 2022, which claims priority from Japanese Patent Application No. 2021-139510, filed Aug. 30, 2021, the entire contents of each are incorporated herein by reference.

TECHNICAL FIELD

The present disclosure relates to positioning methods, lunar positioning systems, and positioning satellites.

BACKGROUND ART

Advancement to the moon and planets such as Mars has been accelerating. Thus, it is required to conduct maintenance of means for position measurement and environments of flying objects heading from the earth to the moon or a planet, round-trip flying objects, and flying objects orbiting the moon or a planet. On the earth and in the atmosphere of the earth, it is possible to conduct position measurement in the earth-fixed coordinate system by a positioning satellite group. Also on the periphery of the earth, as with on the earth and in the atmosphere of the earth, it is possible to conduct position measurement in the earth-fixed coordinate system with positioning signals of a positioning satellite group.

Patent Literature 1 discloses a method of propelling a transport ship by electric propulsion from a low earth orbit or a stationary orbit to a target orbit or a destination.

CITATION LIST

Patent Literature

Patent Literature 1: WO 2018/029839

SUMMARY OF INVENTION

Technical Problem

Positioning signals transmitted from positioning satellites are managed by the ITU to soundly maintain radio environments. This poses a problem in which the frequency and the transmission level have restrictions and flying away from the earth makes positioning impossible with the positioning signals being buried in noise. ITU is an abbreviation of International Telecommunication Union.

In the present disclosure, from the ground station with known position coordinates in the earth-fixed coordinate system, a positioning signal is transmitted with a narrow-band beam having directivity toward the flying object flying in a far distance. With this, an object is to allow position measurement of the flying object in the earth-fixed coordinate system.

Solution to Problem

A positioning method according to the present disclosure is a positioning method of measuring position coordinates of a flying object flying in an outer space from the earth to the moon or a planet or near the moon or a planet.

The flying object includes a positioning-signal reception device. The ground station includes a positioning-signal transmission device equipped with a directivity-direction control function and has known position coordinates in an earth-fixed coordinate system.

The flying object measures position coordinates in the earth-fixed coordinate system by receiving a positioning signal transmitted from the ground station simultaneously from the ground stations at four locations.

Advantageous Effects of Invention

In the positioning method according to the present disclosure, from the ground station with known position coordinates in the earth-fixed coordinate system, a positioning signal is transmitted with a narrow-band beam having directivity toward the flying object flying a far distance. Thus, according to the positioning method of the present disclosure, an effect is brought in which position measurement of the flying object in the earth-fixed coordinate system can be made.

BRIEF DESCRIPTION OF DRAWINGS

FIG. 3 is a diagram illustrating Example 1 of a positioning method according to Embodiment 1.

FIG. 14 is a diagram illustrating an example of structure of a lunar surface station according to Embodiment 4.

FIG. 18 is a diagram illustrating an example of structure of a positioning satellite according to Embodiment 6.

DESCRIPTION OF EMBODIMENTS

Figure 1:
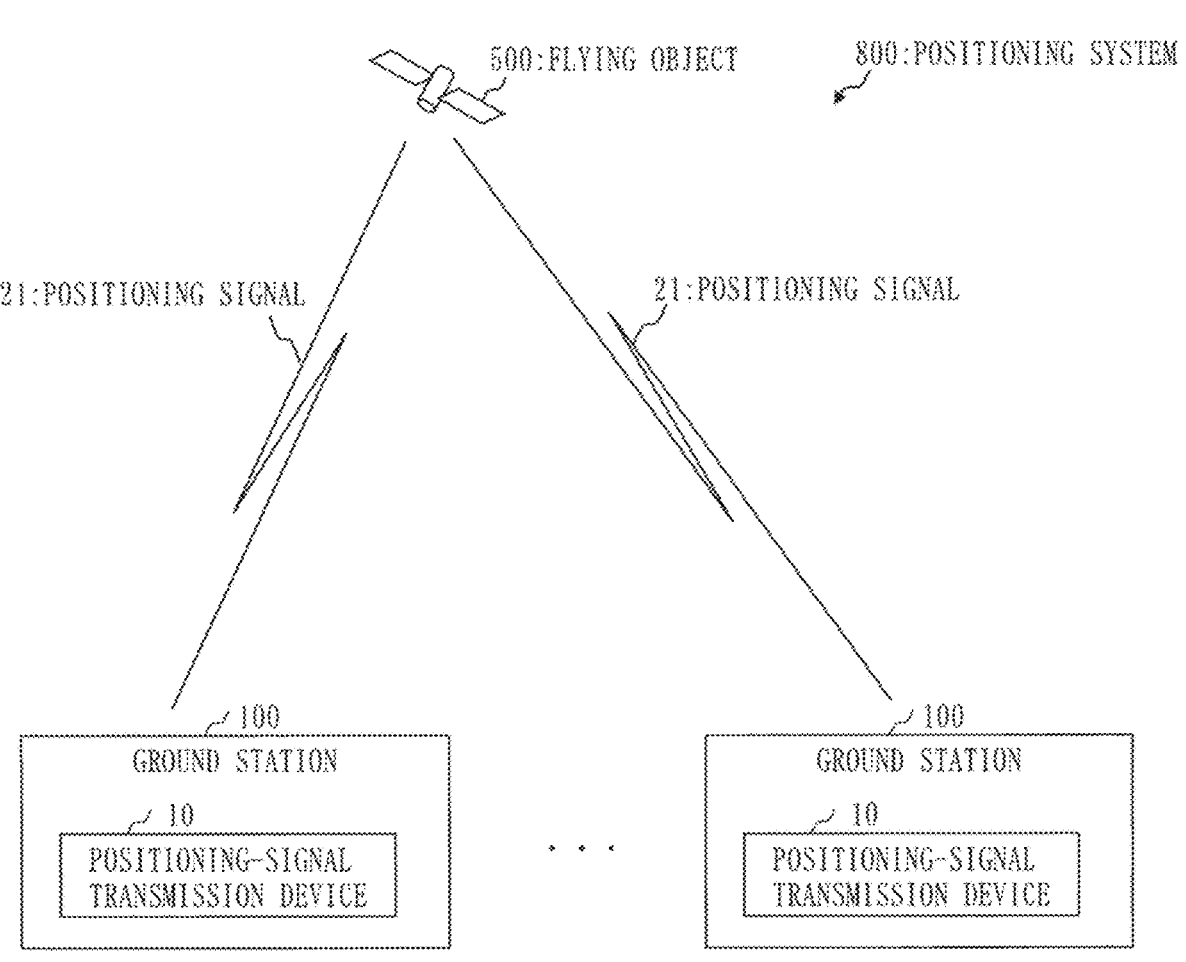
FIG. 1 is a diagram illustrating an example of structure of a positioning system 800 according to Embodiment 1.

Embodiments of the present disclosure are described below by using the drawings. Note in each drawing that identical or corresponding portions are provided with the same reference numeral. In the description of the embodiments, description of identical or corresponding portions is omitted or simplified as appropriate. Also, in the drawings below, the relation in size among the respective structures may be different from the actual one. Furthermore, in the description of the embodiments, directions or positions may be described, such as "above", "below", "left", "right", "forward", "rear", "front", and "back". These representations are merely for convenience of description and are not intended to limit the arrangement and orientation of the structures such as devices, instruments, or components.

Embodiment 1

Figure 2:
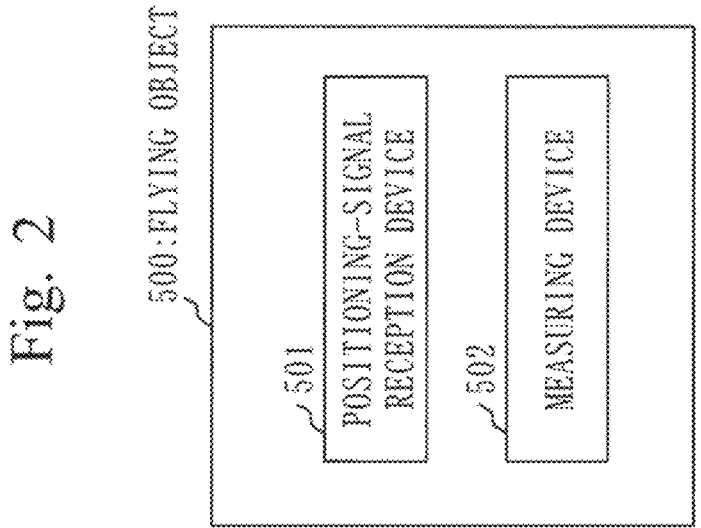
FIG. 2 is a diagram illustrating an example of functional structure of a flying object according to Embodiment 1.

*Description of Structure*
FIG. 1 is a diagram illustrating an example of structure of a position system 800 according to the present embodiment.
FIG. 2 is a diagram illustrating an example of functional structure of a flying object 500 according to the present embodiment.
In the present embodiment, a positioning method of measuring the position coordinates of a flying object 500 flying in the outer space from the earth to the moon or a planet or near the moon or a planet is described.
A ground station 100 is a station that is installed on the ground and has known position coordinates in the earth-fixed coordinate system. The ground station 100 includes a positioning-signal transmission device 10, which is a positioning-signal transmission device equipped with a directivity-direction control function.
The ground station 100 transmits, by the positioning-signal transmission device 10, a positioning signal 21 with a narrow-band beam having directivity toward the flying object 500 flying at a far distance.
The flying object 500 flies in the outer space from the earth to the moon or a planet or near the moon or a planet.
The flying object 500 includes a positioning-signal reception device 501. Also, the flying object 500 includes a measuring device 502.
The positioning-signal reception device 501 receives the positioning signal 21.
The measuring device 502 measures position coordinates of the flying object 500 by the positioning signal 21 received by the positioning-signal reception device 501.

Example 1 of Positioning Method

Figure 3:
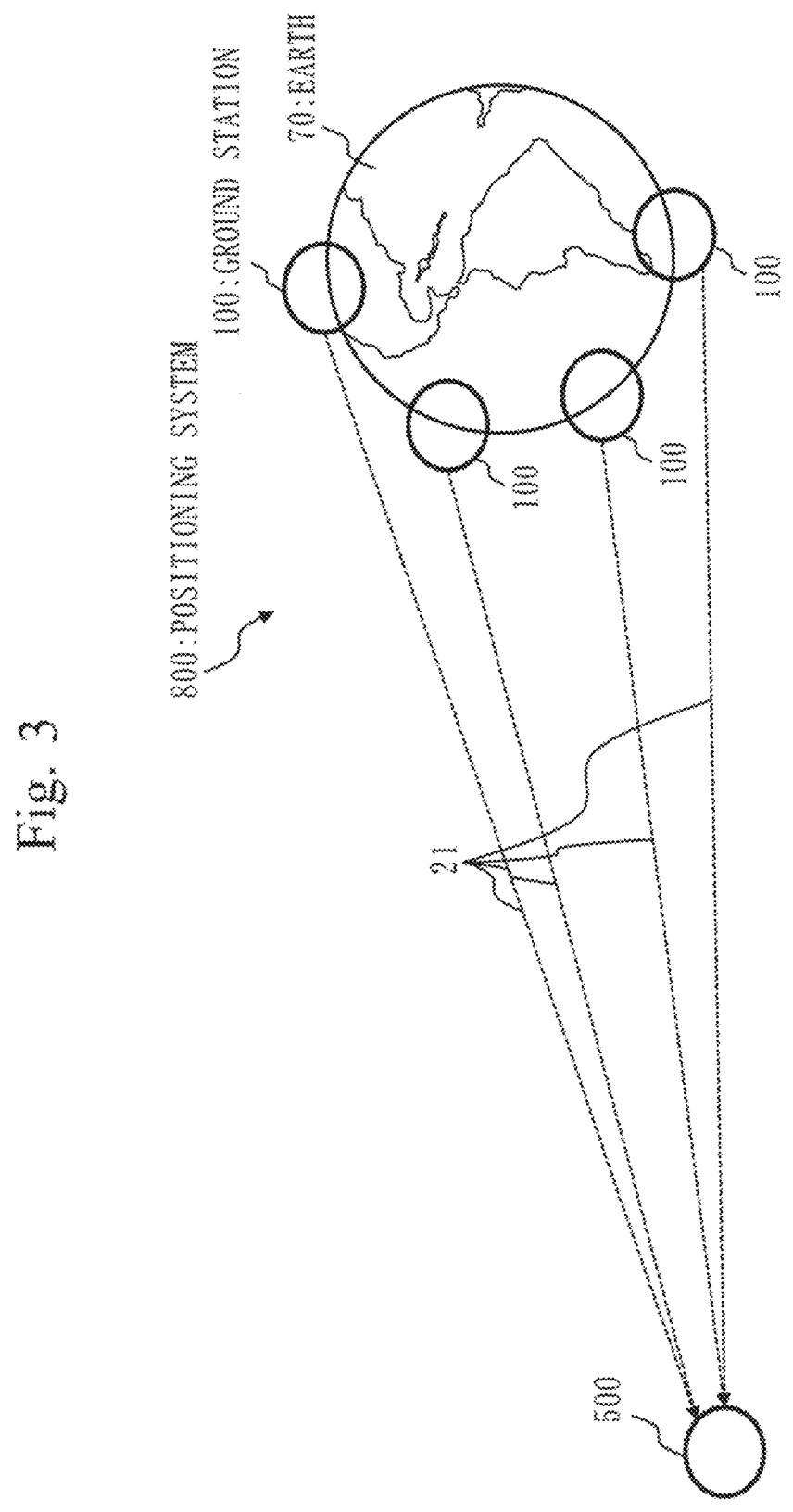

FIG. 3 is a diagram illustrating Example 1 of a positioning method according to the present embodiment.
Example 1 of the positioning method is implemented by the positioning system 800.
In Example 1 of the positioning method, the positioning system 800 includes ground stations 100 installed at four locations on the ground of the earth 70.
The flying object 500 measures the position coordinates in the earth-fixed coordinate system by receiving the positioning signals 21 transmitted from the ground stations 100, simultaneously from the ground stations 100 at the four locations.
Specifically, the flying object 500 receives, by the positioning-signal reception device 501, the positioning signals 21 transmitted with a narrow-band beam having directivity from the positioning-signal transmission devices 10 of the ground stations 100 toward the flying object 500. The positioning-signal reception device 501 receives the positioning signals 21 simultaneously from the ground stations 100 at the four locations.
Then, the flying object 500 measures, by the measuring device 502, the position coordinates of the flying object 500 in the earth-fixed coordinate system by using the positioning signals 21 received simultaneously from the ground stations 100 at the four locations.
In recent years, it has been required to conduct maintenance of means for position measurement and environments of flying objects heading from the earth to the moon or a planet, round-trip flying objects, and flying objects orbiting the moon or a planet. A positioning signal transmitted from a positioning satellite is managed by the ITU to soundly maintain radio environments. Thus, the frequency and the transmission level have restrictions and flying away from the earth may make positioning impossible with the positioning signal being buried in noise.
In Example 1 of the positioning method illustrated in FIG. 3, from the ground stations 100 with known position coordinates in the earth-fixed coordinate system, the positioning signals 21 are transmitted with a narrow-band beam having directivity toward the flying object 500 flying at a far distance. With this, the positioning signals 21 can be transmitted with a significant signal strength, allowing position measurement of the flying object 500 in the earth-fixed coordinate system.
In spatial triangulation, position coordinates are determined by measuring a point where the position coordinates are fixed from the known three points. In a positioning-signal reception device not equipped with a high-precision clock such as an atomic clock, uncertainty of signal arrival time is present. Thus, by receiving the positioning signals 21 simultaneously from the ground stations 100 at the four locations, it is possible to measure the position coordinates of the flying object 500.
Since positioning accuracy is improved more as a solid angle at which the position coordinates look over the known points is larger, positioning by the ground stations 100 in a state of being distributed to a north-south direction and an east-west direction contributes to an improvement in accuracy.

Embodiment 2

In the present embodiment, points that are added to or different from Embodiment 1 are mainly described. Note that structures similar to those of Embodiment 1 are provided with the same reference numerals and their description may be omitted.
In the present embodiment, a positioning method of measuring the position coordinates of the flying object 500 in the outer space from the earth to the moon or a planet or near the moon or a planet is described.
In Embodiment 1, by receiving the positioning signals 21 simultaneously from the ground stations 100 at four locations, the position coordinates of the flying object 500 are measured.
In the present embodiment, a mode is described in which the position coordinates of the flying object 500 are measured by receiving the positioning signals 21 from various satellites 30.
First, by using FIG. 4, an example of structure of the satellite 30 according to the present embodiment is described.

The satellite 30 includes a satellite control device 31, a satellite communication device 32, a propulsion device 33, an attitude control device 34, and a power supply device 35. While the satellite 30 includes other components implementing various functions, in FIG. 4, the satellite control device 31, the satellite communication device 32, the propulsion device 33, the attitude control device 34, and the power supply device 35 are described.

The satellite control device 31 is a computer which controls the propulsion device 33 and the attitude control device 34, and includes a processing circuit. Specifically, the satellite control device 31 controls the propulsion device 33 and the attitude control device 34 by following various commands transmitted from a ground facility.

The satellite communication device 32 is a device which communicates with the ground facility. Specifically, the satellite communication device 32 transmits various types of data regarding its satellite to the ground facility. Also, the satellite communication device 32 receives various commands transmitted from the ground facility.

The propulsion device 33 is a device which provides propulsion to the satellite 30, and changes the speed of the satellite 30. Specifically, the propulsion device 33 is an electrical propulsor. Specifically, the propulsion device 33 can be an ion engine or a Hall thruster.

The attitude control device 34 is a device for controlling attitude elements such as the attitude of the satellite 30 and the angular velocity and the visual line direction (Line Of Sight) of the satellite 30. The attitude control device 34 changes each attitude elements to a desired direction. Alternatively, the attitude control device 34 maintains each attitude elements in a desired direction. The attitude control device 34 includes an attitude sensor, an actuator, and a controller. The attitude sensor is a device such as a gyroscope, an earth sensor, a solar sensor, a star tracker, a thruster, and a magnetic sensor. The actuator is a device such as an attitude control thruster, a momentum wheel, a reaction wheel, and a control moment gyro. The controller controls the actuator by following measurement data of the attitude sensor or various commands from the ground facility.

The power supply device 35 includes devices such as a solar cell, a battery, and a power control device, and supplies electric power to each device with which the satellite 30 is equipped.

The processing circuit included in the satellite control device 31 is described.

The processing circuit may be dedicated hardware or a processor which executes a program stored in a memory.

In the processing circuit, part of the functions my be implemented by dedicated hardware and the remaining functions may be implemented by software or firmware. That is, the processing circuit can be implemented by hardware, software, firmware, or a combination of these.

The dedicated hardware is, specifically, a single circuit, a composite circuit, a programmed processor, a parallel-programmed processor, an ASIC, an FPGA, or a combination of these.

Example 2 of Positioning Method

Figure 5:
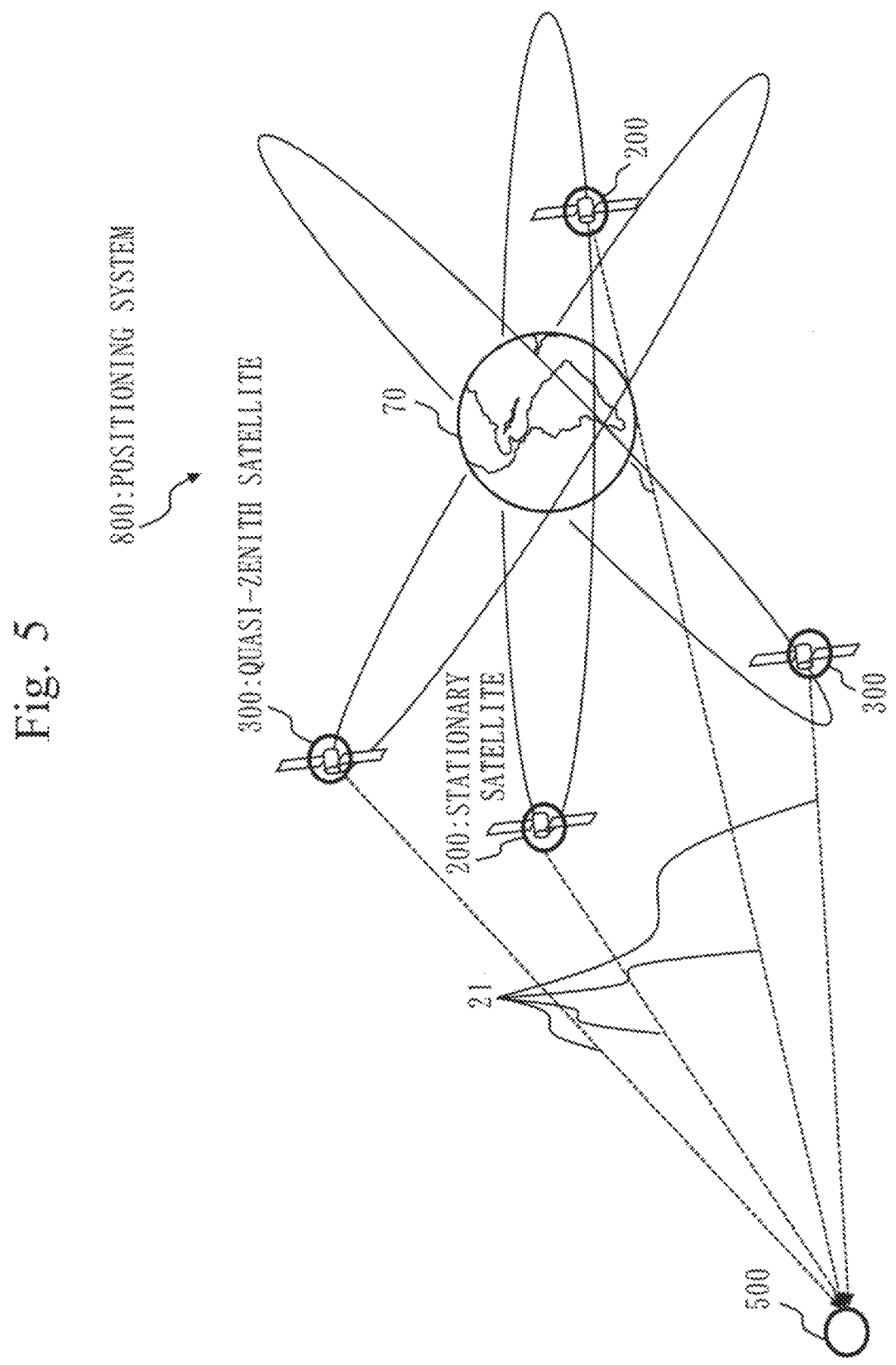
FIG. 5 is a diagram illustrating Example 2 of a positioning method according to Embodiment 2.

FIG. 5 is a diagram illustrating Example 2 of a positioning method according to the present embodiment.

Figure 6:
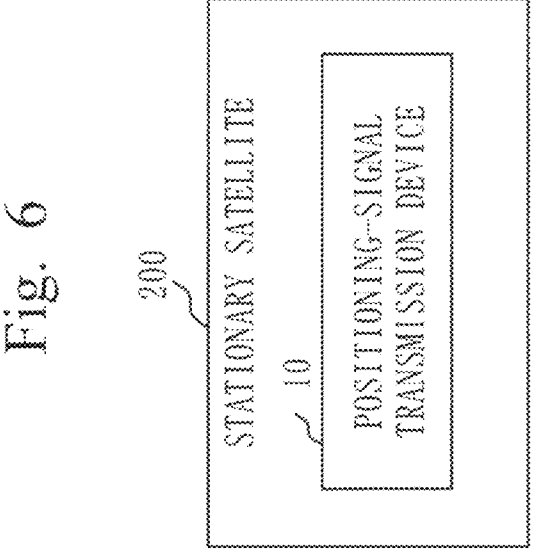
FIG. 6 is a diagram illustrating an example of functional structure of a stationary satellite according to Embodiment 2.

FIG. 6 is a diagram illustrating an example of functional structure of a stationary satellite 200 according to the present embodiment.

Figure 7:
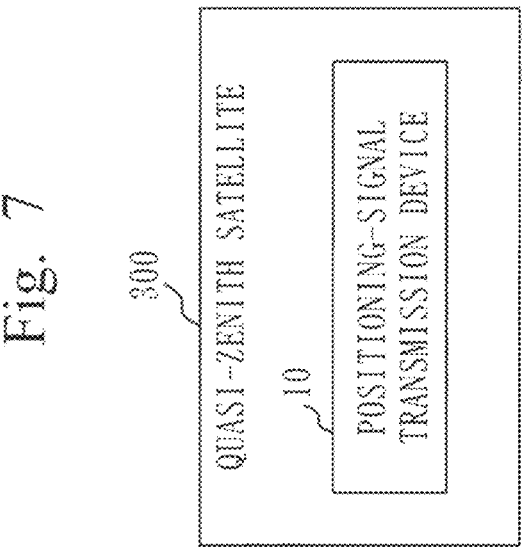
FIG. 7 is a diagram illustrating an example of functional structure of a quasi-zenith satellite according to Embodiment 2.

FIG. 7 is a diagram illustrating an example of functional structure of a quasi-zenith satellite 300 according to the present embodiment.

In Example 2 of the positioning method, the positioning system 800 includes stationary satellites 200 and quasi-zenith satellites 300.

Figure 4:
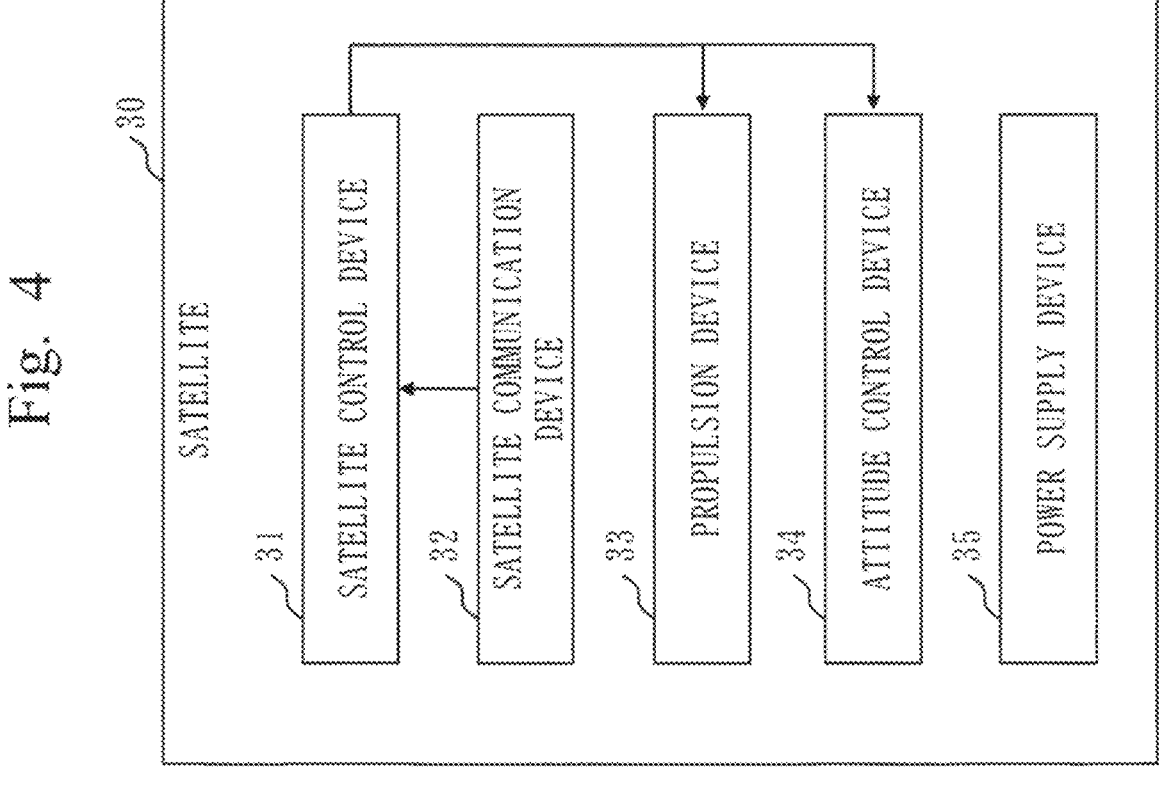
FIG. 4 is a diagram illustrating an example of structure of a satellite according to Embodiment 2.

The stationary satellite 200 has, in addition to the structure of FIG. 4, the functions of the positioning-signal transmission device 10.

The stationary satellite 200 has known position coordinates in the earth-fixed coordinate system.

The quasi-zenith satellite 300 has, in addition to the structure of FIG. 4, the functions of the positioning-signal transmission device 10.

The quasi-zenith satellite 300 has known position coordinates in the earth-fixed coordinate system.

In Example 2 of the positioning method, the flying object 500 measures position coordinates in the earth-fixed coordinate system by receiving the positioning signals 21 transmitted from the stationary satellites 200 and the positioning signals 21 transmitted from the quasi-zenith satellites 300, simultaneously from any four of the stationary satellites 200 and the quasi-zenith satellites 300.

The positioning-signal transmission device 10 included in the stationary satellite 200 or the quasi-zenith satellite 300 may be a positioning-signal transmission device equipped with a directivity-direction control function or may not be a positioning-signal transmission device equipped with a directivity-direction control function.

Note in Example 2 of the positioning method that the following effects are brought even if the positioning-signal transmission device 10 is not a positioning-signal transmission device equipped with a directivity-direction control function.

In Embodiment 1, the positioning method is to transmit the positioning signals 21 from the ground stations 100. The positioning signals 21 transmitted from the ground stations 100 have a problem of a large positioning error due to the delay effect at the time of passing through an ionospheric layer. By contrast, according to the positioning signals 21 transmitted from satellites, since the positioning signals 21 can be transmitted and received without passing through the ionospheric layer, an effect of high positioning accuracy is brought.

The stationary satellite 200 is a satellite that orbits in synchronization with the rotation of the earth 70 at approximately 36000 km above the equator, thereby looking as if it stays up in the air when viewed from the ground surface. When the stationary satellite 200 is orbited with an orbital inclination on the order of 45° with respect to the orbital plane of the stationary satellite 200 in synchronization with the rotation of the earth, the stationary satellite 200 looks as if it moves from south to north when viewed from the ground surface and, strictly speaking, it looks as if it draws a figure eight per day together with left and right movements. This is a quasi-zenith orbit, and the quasi-zenith satellite 300 is utilized as a positioning satellite in a quasi-zenith positioning satellite system.

If position measurement of the flying object 500 is conducted by involving the positioning signals 21 from the quasi-zenith satellites 300 with known position coordinates in the earth-fixed coordinate system as well as the ground stations 100 and the stationary satellites 200, the solid angle is further widened, and therefore an effect of improving measurement accuracy of a flying object at a far distance is brought.

Since positioning accuracy is improved more as the solid angle at which the position coordinates look over the known points is larger, receiving the positioning signals 21 from two stationary satellites 200 away in the east-west direction and two quasi-zenith satellites 300 away in the east-west direction contributes to an improvement in position accuracy.

Also, since the earth rotates itself, a specific ground station cannot continuously transmit positioning signals to a flying object flying around the moon. Thus, there is a problem in which many ground stations are required. By contrast, the stationary satellites 200 and the quasi-zenith satellites 300 have an effect in which, while there is a geometric restriction in which the stationary satellites 200 and the quasi-zenith satellites 300 are partially hidden by the shadow of the earth, compared with the ground stations, a time during which one satellite continuously transmits the positioning signals 21 to the flying object 500 is long. Thus, the effect is brought in which the total number of satellites required is required to be less, compared with the total number of ground stations required when the positioning signals 21 are transmitted only from the ground station.

Also, when the positioning-signal transmission device 10 is a positioning-signal transmission device equipped with a directivity-direction control function, the following effects are further brought.

When the flying position of the flying object 500 is at a far distance, there is a problem in which the positioning signal transmitted from a normal positioning-signal transmitter is buried in noise and cannot be measured.

Thus, from the stationary satellites 200 or the quasi-zenith satellites 300 with known position coordinates in the earth-fixed coordinate system, the positioning signals 21 are transmitted with a narrow-band beam having directivity toward the flying object 500 flying at a far distance. With this, the positioning signal can be transmitted with a significant signal strength, allowing position measurement of the flying object 500 in the earth-fixed coordinate system.

Example 3 of Positioning Method

Figure 8:
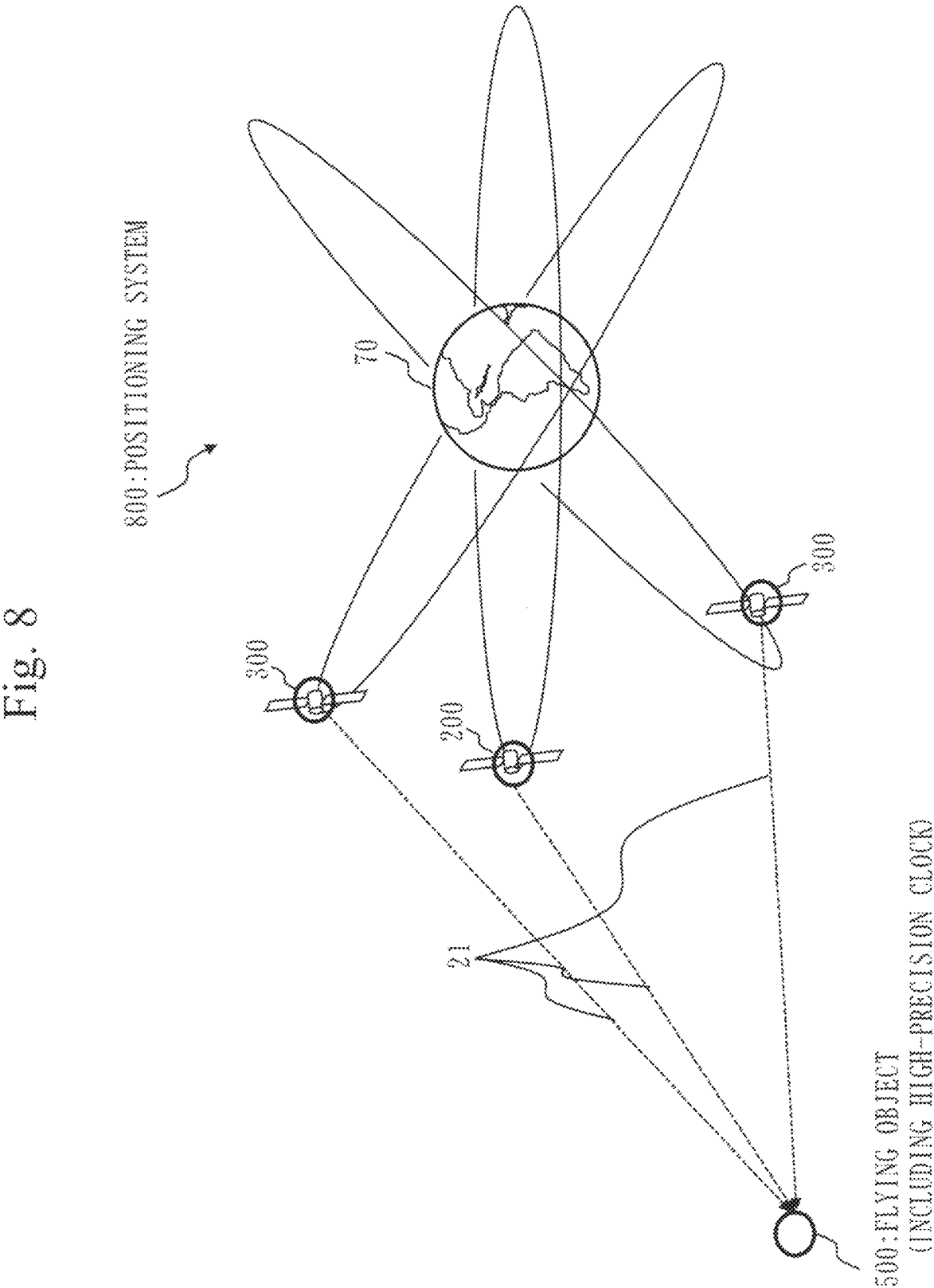
FIG. 8 is a diagram illustrating Example 3 of the positioning method according to Embodiment 2.

FIG. 8 is a diagram illustrating Example 3 of the positioning method according to the present embodiment.

Figure 9:
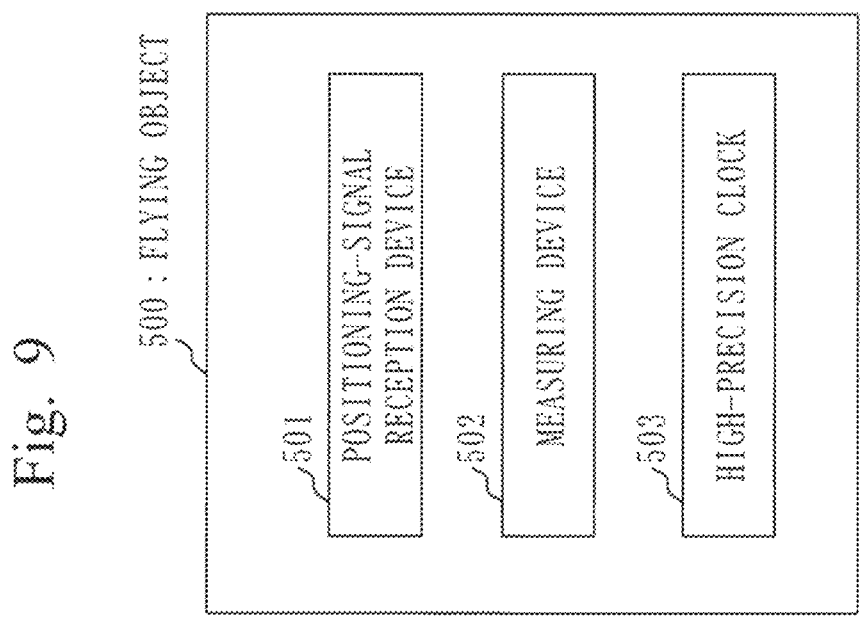
FIG. 9 is a diagram illustrating an example of functional structure of a flying object in Example 3 of the positioning method according to Embodiment 2.

FIG. 9 is a diagram illustrating an example of functional structure of the flying object 500 in Example 3 of the positioning method according to the present embodiment.

In Example 3 of the positioning method, the flying object 500 includes, in addition to the positioning-signal reception device 501 and the measuring device 502, a high-precision clock 503.

A specific example of the high-precision clock 503 is a clock with high precision such as an atomic clock or an optical lattice clock.

The flying object 500 measures the position coordinates in the earth-fixed coordinate system by receiving the positioning signal 21 transmitted from the stationary satellite 200 and the positioning signals 21 transmitted from the quasi-zenith satellites 300, simultaneously from any three of the stationary satellites 200 and the quasi-zenith satellites 300.

The positioning-signal transmission device 10 included in the stationary satellite 200 or the quasi-zenith satellite 300 may be a positioning-signal transmission device equipped with a directivity-direction control function or may not be a positioning-signal transmission device equipped with a directivity-direction control function.

If the flying object 500 includes the high-precision clock 503 such as an atomic clock or an optical lattice clock, an effect can be brought in which the flying object 500 can measure the position coordinates only by receiving the positioning signals 21 from the three locations with known position coordinates.

Note that if the stationary satellite 200 or the quasi-zenith satellites 300 include a positioning-signal transmission device equipped with a directivity-direction control function, position measurement is possible even for a flying object at a farther distance, which is similar to that of Example 2 of the positioning method.

Example 4 of Positioning Method

In Example 4 of the positioning method, the flying object 500 includes the positioning-signal reception device 501 and the measuring device 502. The flying object 500 may or may not include the high-precision clock 503.

The stationary satellite 200 is assumed to include the positioning-signal transmission device 10 and have known position coordinates in the earth-fixed coordinate system or inertial coordinate system.

The quasi-zenith satellite 300 is assumed to include the positioning-signal transmission device 10 and have known position coordinates in the earth-fixed coordinate system or the inertial coordinate system.

The flying object 500 measures the position coordinates in the inertial coordinate system by receiving the positioning signals 21 transmitted from the stationary satellites 200 and the positioning signals 21 transmitted from the quasi-zenith satellites 300, simultaneously from any three or more of the stationary satellites 200 and the quasi-zenith satellites 300.

The earth-fixed coordinate system and the inertial coordinate system can be subjected to coordinate conversion. Thus, the position coordinates of the stationary satellite 200 or the quasi-zenith satellite 300 with known position coordinates in the earth-fixed coordinate system can be converted to those in the inertial coordinate system.

If the flying object 500 includes the high-precision clock 503, the flying object 500 can measure the position coordinates by receiving the positioning signals 21 from any three of the stationary satellites 200 and the quasi-zenith satellites 300.

On the other hand, if the flying object 500 does not include the high-precision clock 503, the flying object 500 can measure the position coordinates by receiving the positioning signals 21 from any four of the stationary satellites 200 and the quasi-zenith satellites 300.

In a flying object for the purpose of lunar probe or planet probe, it is rational to conduct position measurement with the inertial coordinate system rather than the earth-fixed coordinate system in which the flying object rotates in synchronization with the rotation of the earth. Thus, according to Example 4 of the positioning method, an effect of excellent convenience as a positioning method for a flying object for the purpose of lunar/planet probe is brought.

Embodiment 3

In the present embodiment, points that are added to or different from Embodiments 1 and 2 are mainly described. Note that structures similar to those of Embodiments 1 and 2 are provided with the same reference numerals and their description may be omitted.

In the present embodiment, a positioning method of measuring position coordinates of a second flying object 520 is described. The second flying object 520 flies in the outer space from the earth to the moon or a planet or near the moon or a planet and includes the positioning-signal reception device 501.

Example 5 of Positioning Method

Figure 10:
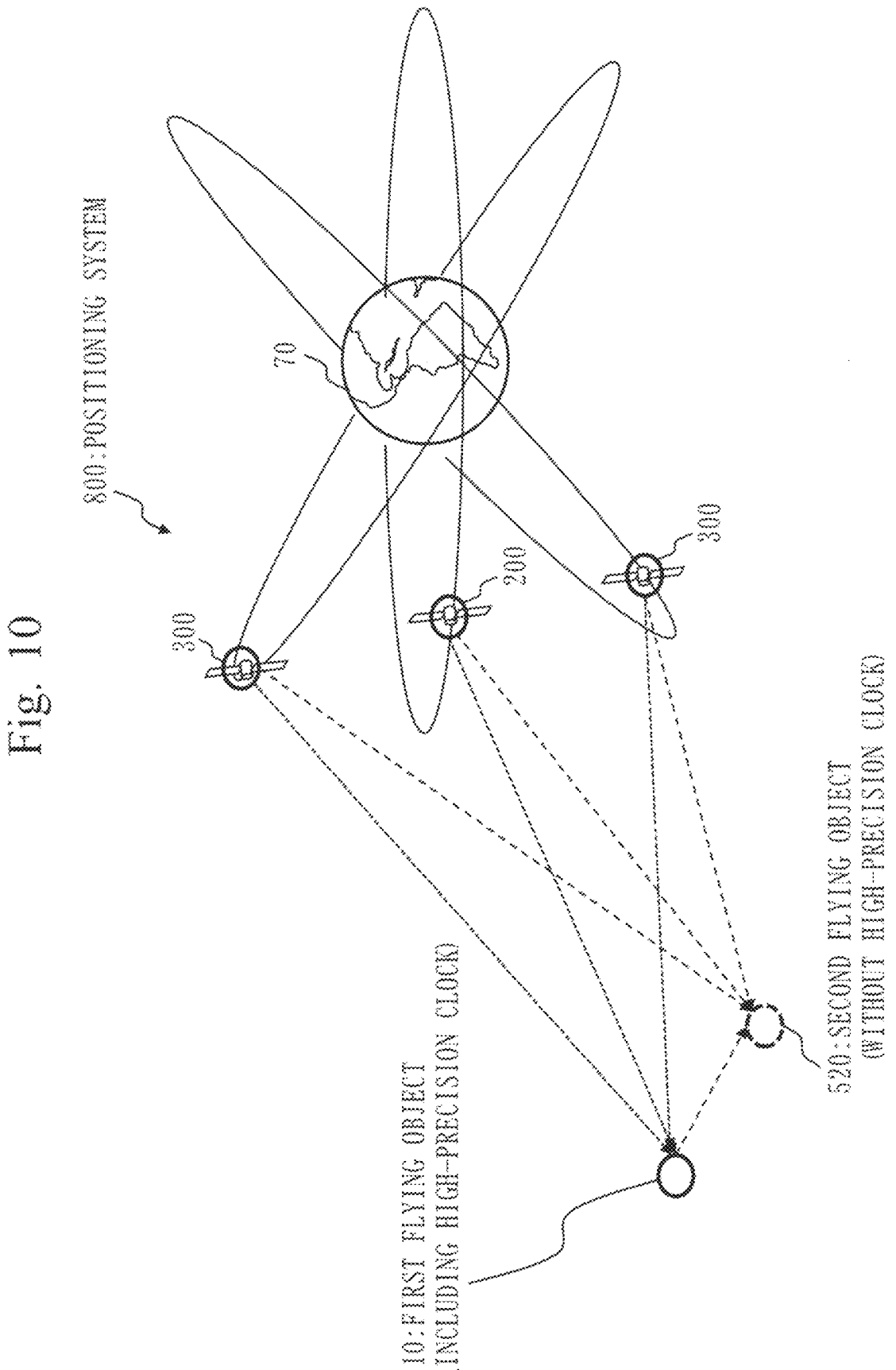
FIG. 10 is a diagram illustrating Example 5 of a positioning method according to Embodiment 3.

FIG. 10 is a diagram illustrating Example 5 of a positioning method according to the present embodiment.

Figure 11:
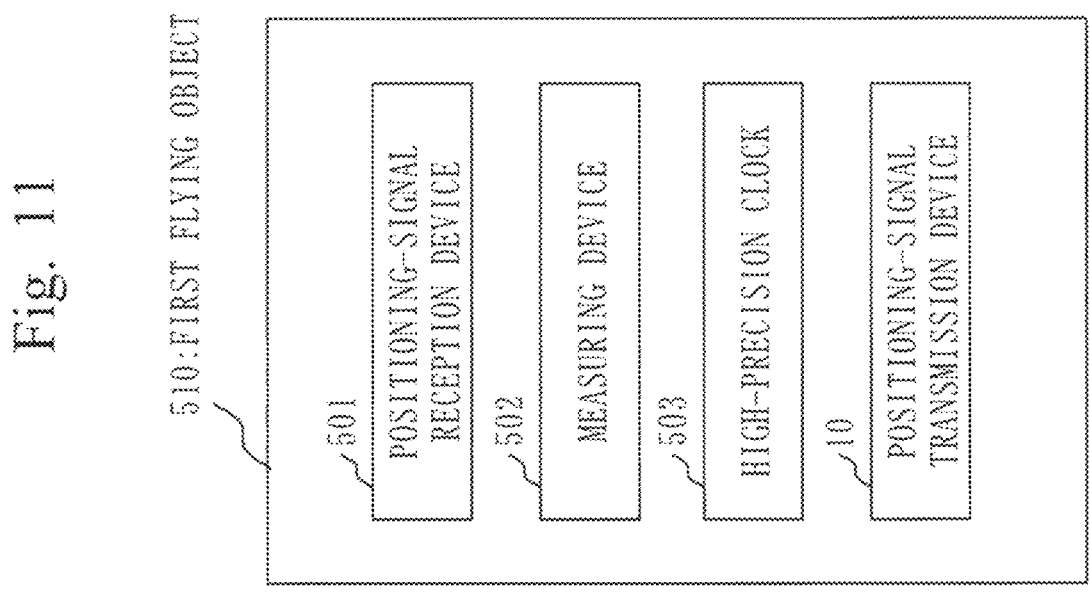
FIG. 11 is a diagram illustrating an example of structure of a first flying object according to Embodiment 3.

FIG. 11 is a diagram illustrating an example of structure of a first flying object 510 according to the present embodiment.

In Example 5 of the positioning method, the positioning system 800 is configured of the first flying object 510, the stationary satellite 200, and the quasi-zenith satellites 300.

The first flying object 510 is a flying object including the high-precision clock 503, the positioning-signal reception device 501, and the positioning-signal transmission device 10. Furthermore, the first flying object 510 also includes the measuring device 502.

The second flying object 520 is a flying object including the positioning-signal device 501. Furthermore, the second flying object 520 also includes the measuring device 502.

The stationary satellite 200 includes the positioning-signal transmission device 10, and has known position coordinates in the earth-fixed coordinate system or the inertial coordinate system.

The quasi-zenith satellite 300 includes the positioning-signal transmission device 10, and has known position coordinates in the earth-fixed coordinate system or the inertial coordinate system.

The first flying object 510 measures the position coordinates in the earth-fixed coordinate system or the inertial coordinate system by receiving the positioning signals 21 simultaneously from any three or more of the stationary satellites 200 and the quasi-zenith satellites, and transmits the positioning signal 21 as a flying object with known position coordinates.

The second flying object 520 measures the position coordinates in the earth-fixed coordinate system or the inertial coordinate system by receiving the positioning signals 21 simultaneously from the first flying object 510 and any three of the stationary satellites 200 and the quasi-zenith satellites 300.

Since the first flying object 510 includes the high-precision clock 503, it can measure the position coordinates if it receives the positioning signals 21 from any three of the stationary satellites 200 and the quasi-zenith satellites 300, and can transmit the positioning signals 21 as a flying object with known position coordinates.

The second flying object 520 that does not include a high-precision clock can measure the position coordinates also by involving uncertainty of time, if receiving the positioning signals 21 simultaneously from four locations with known position coordinates. Thus, the second flying object 520 that does not include a high-precision clock can measure the position coordinates if receiving the positioning signals 21 from the first flying object 510 and any three of the stationary satellites 200 and the quasi-zenith satellites 300.

Note that the stationary satellites 200 or the quasi-zenith satellites 300 as reception sources from which the first flying object 510 receives the positioning signals 21 may be satellites other than the stationary satellites 200 or the quasi-zenith satellites 300 as reception sources from which the second flying object 520 receives the positioning signals 21.

Embodiment 4

In the present embodiment, points that are added to or different from Embodiments 1 to 3 are mainly described. Note that structures similar to those of Embodiments 1 to 3 are provided with the same reference numerals and their description may be omitted.

In the present embodiment, a positioning method of measuring position coordinates of a second flying object 520 is described. The second flying object 520 flies in the outer space from the earth to the moon or a planet or near the moon or a planet and includes the positioning-signal reception device 501.

Example 6 of Positioning Method

Figure 12:
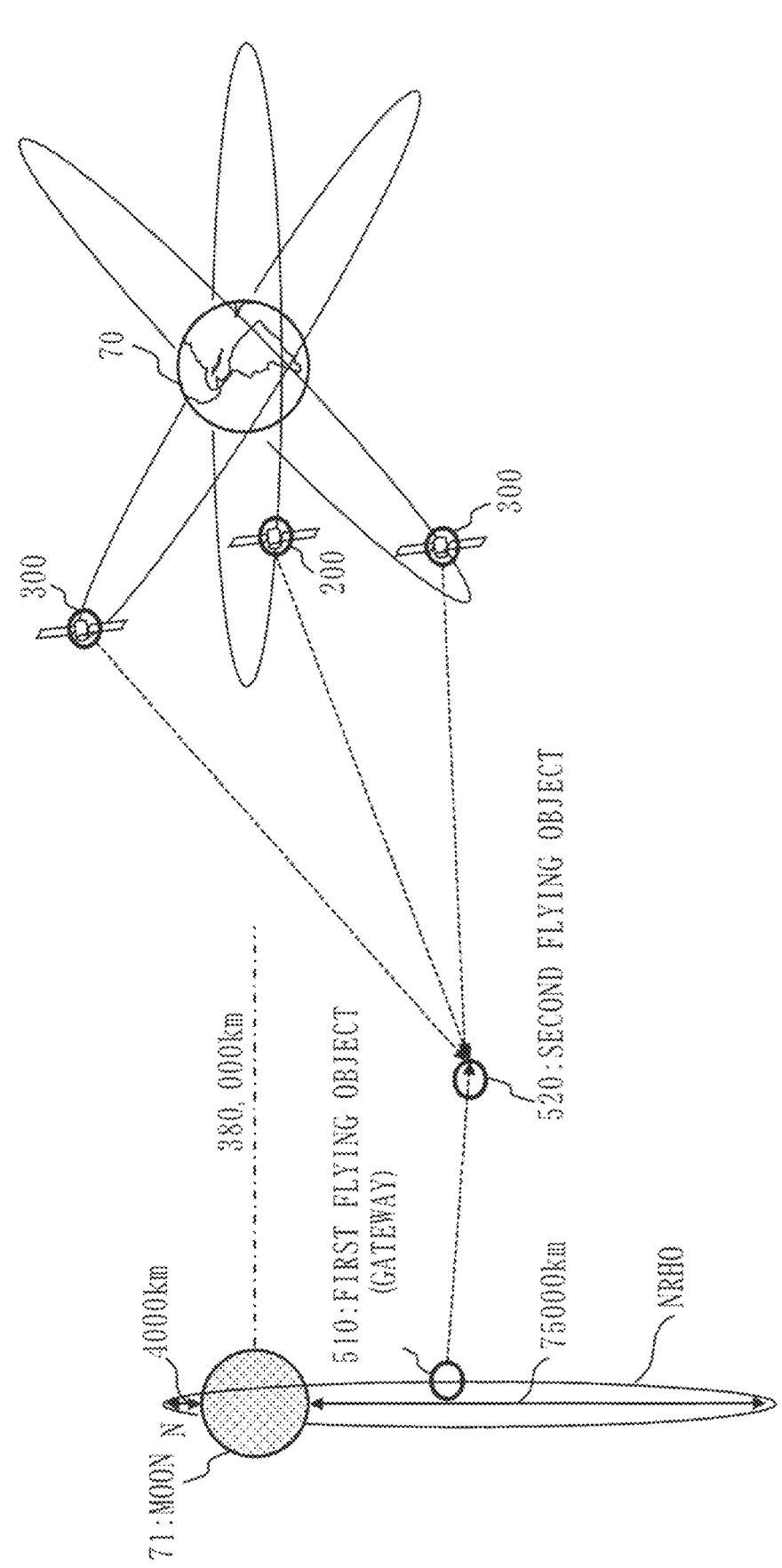
FIG. 12 is a diagram illustrating Example 6 of a positioning method according to Embodiment 4.

FIG. 12 is a diagram illustrating Example 6 of a positioning method according to the present embodiment.

In Example 6 of the positioning method, the positioning system 800 is configured of the first flying object 510, the stationary satellite 200, and the quasi-zenith satellites 300.

The first flying object 510 orbits around the moon 71. The first flying object 510 includes the positioning-signal transmission device 10 and orbits around the moon 71, and has known position coordinates in the moon-fixed coordinate system or the inertial coordinate system.

The stationary satellite 200 includes the positioning-signal transmission device 10 and has known position coordinates in the inertial coordinate system.

The quasi-zenith satellite 300 includes the positioning-signal transmission device 10 and has known position coordinates in the inertial coordinate system.

The second flying object 520 measures the position coordinates in the inertial coordinate system by receiving the positioning signals 21 simultaneously from the first flying object 510 and any three of the stationary satellites 200 and the quasi-zenith satellites 300.

As the moon-fixed coordinate system, a lunar-surface coordinate system has been known in which a crater in a small bowl shape called "Mösting A" is taken as a reference position and position coordinates on the lunar surface are defined with two values corresponding to the longitude and the latitude of the earth.

By taking the barycenter of the moon as an origin point, the moon-fixed coordinate system can be defined by setting a three-dimensional coordinate system in which an altitude is added to a longitude and a latitude.

The orbital plane of the moon (revolution plane with respect to the earth) is inclined by 5.15° with respect to the ecliptic, and the rotating axis of the moon is inclined by 6.69° from the ecliptic perpendicular line. In the earth with the rotating axis being inclined by 23.4° from the ecliptic perpendicular line, as with the case in which coordinate conversion can be made between the earth-fixed coordinate system and the inertial coordinate system, coordinate conversion can be made between the moon-fixed coordinate system and the inertial coordinate system.

As a future foothold for moon/planet probes, there is a conception of LOP-G (hereinafter referred to as gateway). It has been studied that, at a Lagrangian point where the gravitational potentials of the earth and the moon are at an equilibrium, the gateway is operated with a very narrow oval orbit called NRHO. NRHO is an extremely narrow oval orbit at altitudes of 4000 km to 75000 km, orbiting around the moon from south to north.

LOP-G is an abbreviation of Lunar Orbital Platform-Gateway. NRHO is an abbreviation of Near Rectilinear Halo Orbit.

It is assumed that the gateway includes a high-precision clock and a positioning-signal transmission device and has known position coordinates in the moon-fixed coordinate system or the inertial coordinate system. Here, in the second flying object flying between the earth and the moon in a space called cislunar, the position coordinates of the gateway are known, and if measurement can be conducted by involving a positioning signal from the gateway, an effect of increasing the solid angle and improving positioning accuracy is brought.

Position measurement of the gateway may be conducted by any of Example 2 of the positioning method to Example 5 of the positioning method or may be analytically derived by using a distance or angle separately measured from the ground and orbital information of a lunar orbit or the like.

By conducting positioning by involving the first flying object 510 orbiting around the moon, an effect of improving distance measurement accuracy from the earth for the second flying object 520 flying between the earth and the moon is brought.

Also, when the gateway flies in NRHO, it moves southward on the order of 75000 km from the ecliptic plane. Thus, an effect of allowing large positioning of the solid angle viewed from the second flying object 520 and improving positioning accuracy is brought.

Example 7 of Positioning Method

Figure 13:
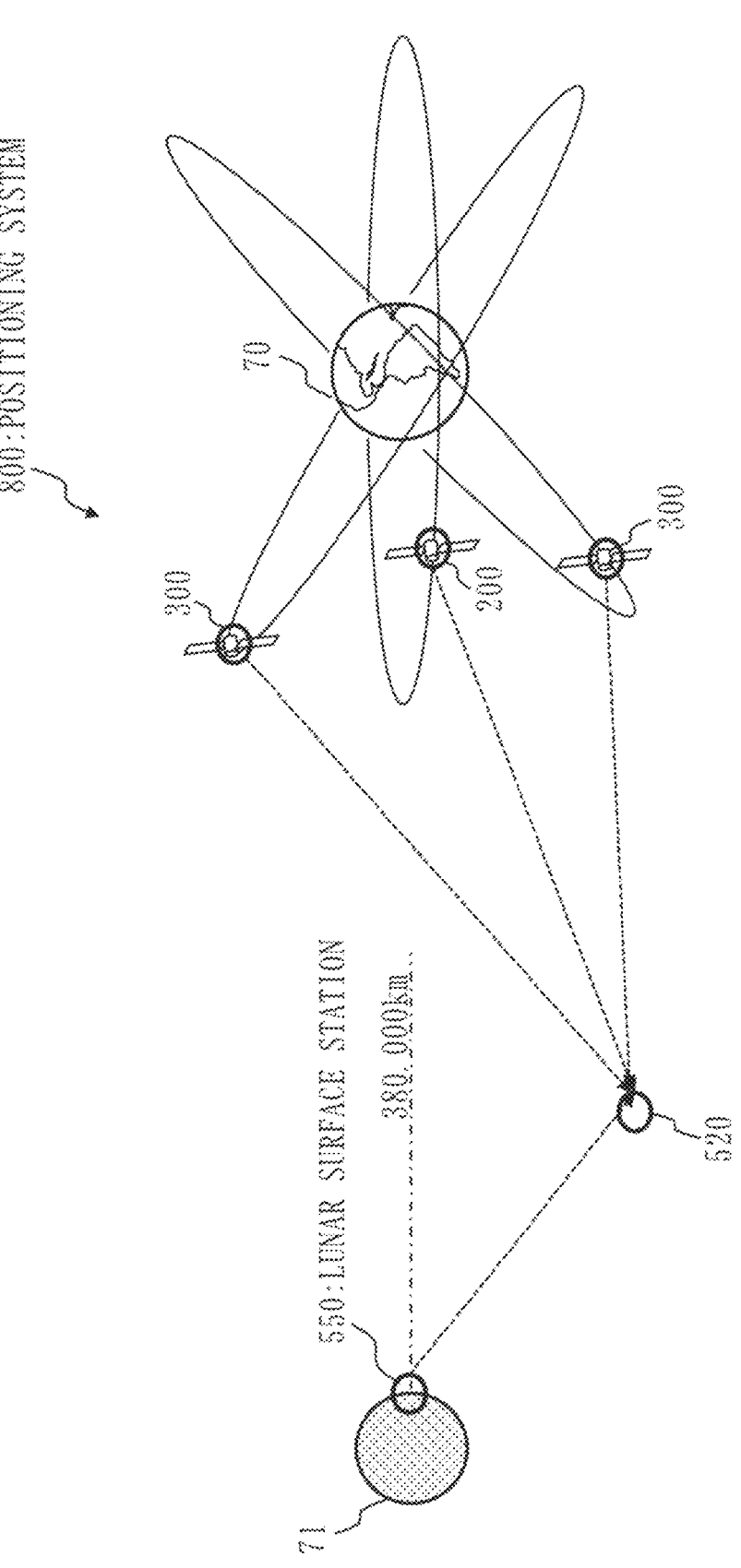
FIG. 13 is a diagram illustrating Example 7 of the positioning method according to Embodiment 4.

FIG. 13 is a diagram illustrating Example 7 of the positioning method according to the present embodiment.

Figure 14:
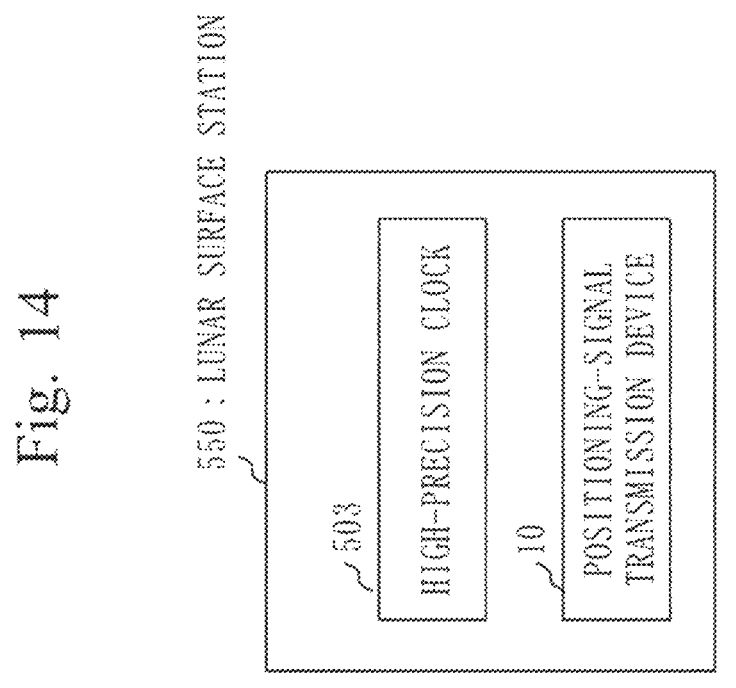

FIG. 14 is a diagram illustrating an example of structure of a lunar surface station 550 according to the present embodiment.

In Example 7 of the positioning method, the positioning system 800 is configured of the lunar surface station 550, the stationary satellite 200, and the quasi-zenith satellites 300.

The lunar surface station 550 is installed on the lunar surface, and includes the high-precision clock 503 and the positioning-signal transmission device 10.

The stationary satellite 200 includes the positioning-signal transmission device 10 and has known position coordinates in the inertial coordinate system.

The quasi-zenith satellite 300 includes the positioning-signal transmission device 10 and has known position coordinates in the inertial coordinate system.

The second flying object 520 measures the position coordinates in the inertial coordinate system by receiving the positioning signals 21 simultaneously from the lunar surface station 550 and any three of the stationary satellites 200 and the quasi-zenith satellites 300.

The lunar surface station 550 includes the high-precision clock 503 and the positioning-signal transmission device 10, and is constructed on the lunar surface. Compared with a flying object with its operation life being limited, the lunar surface station 550 has an effect in which it can be permanently utilized as a position coordinate reference in the moon coordinate system in maintenance or exchange of devices and so forth.

Example 8 of Positioning Method

Figure 15:
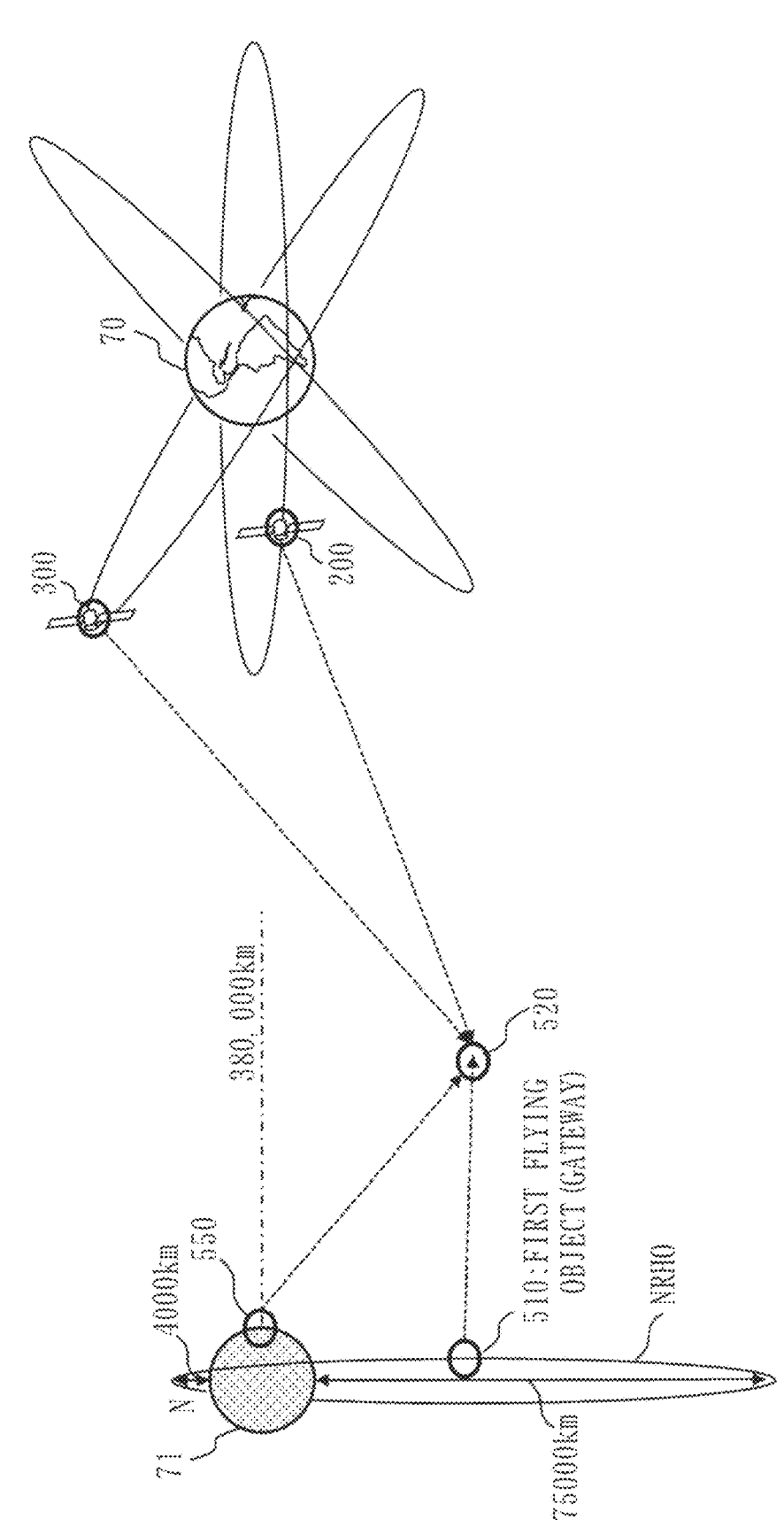
FIG. 15 is a diagram illustrating Example 8 of the positioning method according to Embodiment 4.

FIG. 15 is a diagram illustrating Example 8 of the positioning method according to the present embodiment.

In Example 8 of the positioning method, the positioning system 800 is configured of the lunar surface station 550, the first flying object 510, the stationary satellite 200, and the quasi-zenith satellites 300.

The lunar surface station 550 is installed on the lunar surface, and includes the high-precision clock 503 and the positioning-signal transmission device 10. The lunar surface station 550 has known position coordinates in the moon-fixed coordinate system or the inertial coordinate system.

The first flying object 510 orbits around the moon. The first flying object 510 includes the positioning-signal transmission device 10 and orbits around the moon, and has known position coordinates in the moon-fixed coordinate system or the inertial coordinate system.

The stationary satellite 200 includes the positioning-signal transmission device 10 and has known position coordinates in the inertial coordinate system.

The quasi-zenith satellite 300 includes the positioning-signal transmission device 10 and has known position coordinates in the inertial coordinate system.

The second flying object 520 measures position coordinates in the inertial coordinate system by receiving the positioning signals 21 simultaneously from the lunar surface station 550, the first flying object 510, and any two of the stationary satellites 200 and the quasi-zenith satellites 300.

By measuring the position coordinates of the second flying object 520 by involving the lunar surface station 550 and the first flying object 510 orbiting around the moon, an effect is brought in which flying position measurement accuracy of the second flying object 520 flying between the earth and the moon can be improved.

Also, an effect is brought in which the position coordinates of the second flying object 520, such as a planet probe satellite flying in a distance farther than the moon when viewed from the earth, can be measured.

Embodiment 5

In the present embodiment, points that are added to or different from Embodiments 1 to 4 are mainly described. Note that structures similar to those of Embodiments 1 to 4 are provided with the same reference numerals and their description may be omitted.

In the present embodiment, a lunar positioning system 801 capable of measuring position coordinates in the moon-fixed coordinate system of a movable body on the lunar surface or the second flying object flying near the moon is described.

Figure 16:
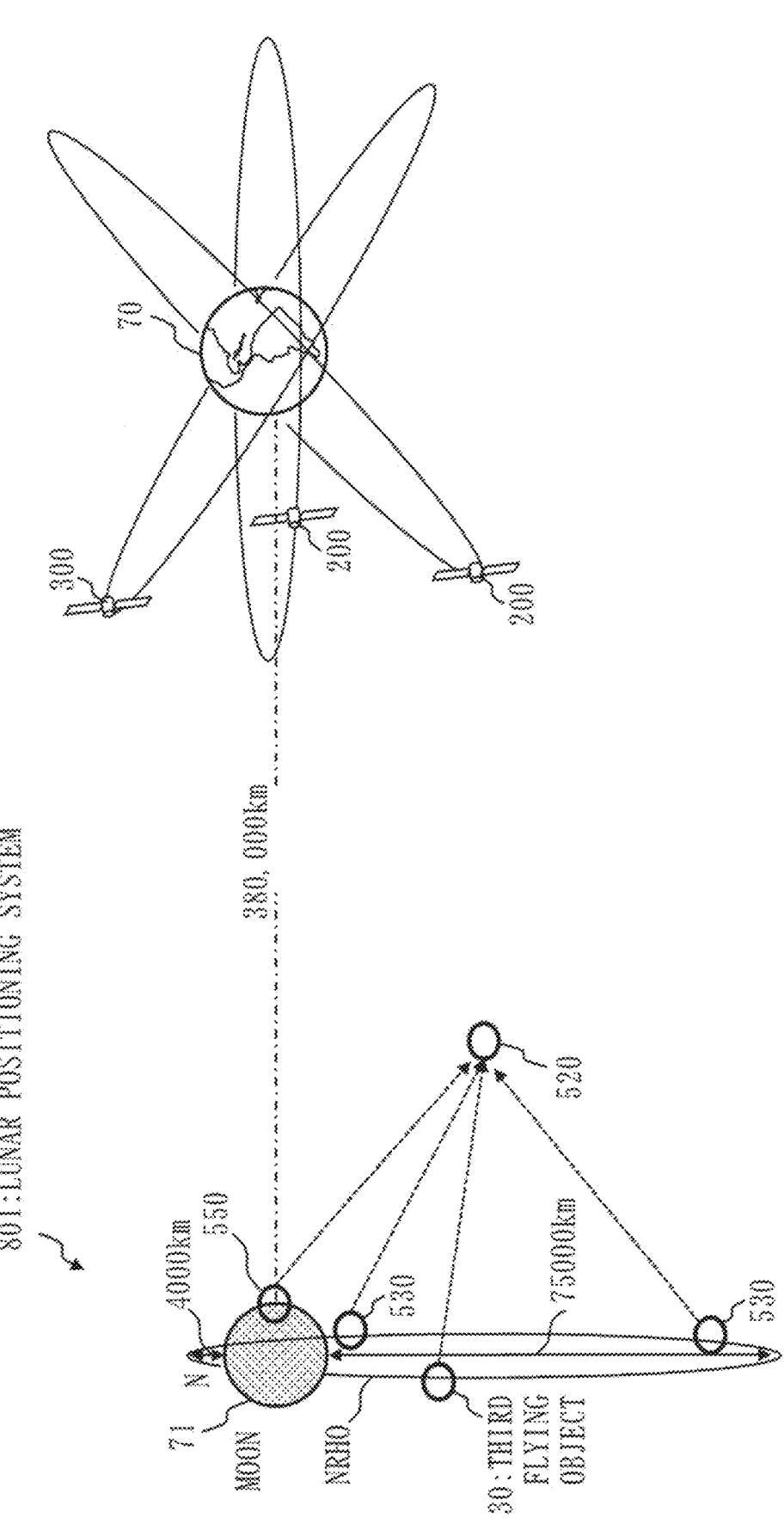
FIG. 16 is a diagram illustrating an example of structure of a lunar positioning system according to Embodiment 5.

FIG. 16 is a diagram illustrating an example of structure of the lunar positioning system 801 according to the present embodiment.

Figure 17:
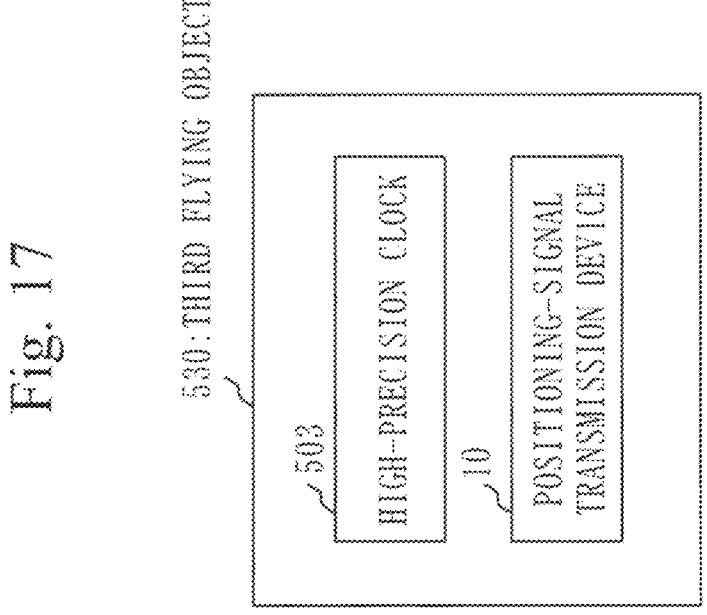
FIG. 17 is a diagram illustrating an example of structure of a third flying object according to Embodiment 5.

FIG. 17 is a diagram illustrating an example of structure of a third flying object 530 according to the present embodiment.

The lunar surface station 550 is installed on the lunar surface, includes the high-precision clock 503 and the positioning-signal transmission device 10, and has known position coordinates in the moon-fixed coordinate system.

The third flying object 530 orbits around the moon. The third flying object 530 includes the high-precision clock 503 and the positioning-signal transmission device 10 and orbits around the moon, and has known position coordinates in the moon-fixed coordinate system.

The lunar positioning system 801 is configured of both or one of the lunar surface station 550 and the third flying object 530, and the total number of the lunar surface stations 550 and the third flying objects 530 is four or more.

Note that while an example is illustrated in FIG. 16 in which the third flying object flies in the same orbital plane, it goes without saying that the third flying object may fly in a different orbital plane.

According to the lunar positioning system 801, in a movable body including a positioning-signal reception device and working on the lunar surface, such as a rover, or the second flying object 520 flying near the moon, position coordinates in the moon-fixed coordinate system can be measured.

For the movable body on the lunar surface or the second flying object 520 flying near the moon, if the positioning signals are received from the lunar surface stations 550 or lunar-orbiting satellites (third flying objects 530) at four or more locations with known moon-fixed coordinate system, as with the positioning satellite system on the earth, position coordinates in the moon-fixed coordinate system can be measured.

When human advances to the lunar surface progresses, ensuring positioning locations on the lunar surface and forming a positioning system for the moon-fixed coordinate system brings an effect of enhancing convenience in operation control of the lunar-orbiting satellites.

According to Example 2 of the positioning method to Example 8 of the positioning method, the lunar surface stations or the lunar-orbiting satellites with known inertial coordinate system can be maintained. Since coordinate conversion can be made between the inertial coordinate system and the moon-fixed coordinate system, the lunar surface stations or the lunar-orbiting satellites with known position coordinates in the moon-fixed coordinate system can be maintained.

Furthermore, the lunar surface stations or the lunar-orbiting satellites with known position coordinates in the moon-fixed coordinate system, including measuring means extensively used with activities on the lunar surface, can be increased. With this, a lunar positioning system can be constructed in which the movable body on the lunar surface or the second flying object near the moon can receive positioning signals simultaneously from lunar surface stations or lunar-orbiting satellites at four or more locations.

According to the lunar positioning system, an effect is brought in which the position coordinates of the movable body on the lunar surface or the second flying object flying near the moon in the moon-fixed coordinate system can be measured.

Embodiment 6

In the present embodiment, points that are added to or different from Embodiments 1 to 5 are mainly described. Note that structures similar to those of Embodiments 1 to 5 are provided with the same reference numerals and their description may be omitted.

In the present embodiment, the structure of a positioning satellite 400 such as the stationary satellite 200 or the quasi-zenith satellite 300 for used in Example 2 of the positioning method to Example 8 of the positioning method is described.

FIG. 18 is a diagram illustrating an example of structure of the positioning satellite 400 according to the present embodiment.

Figure 19:
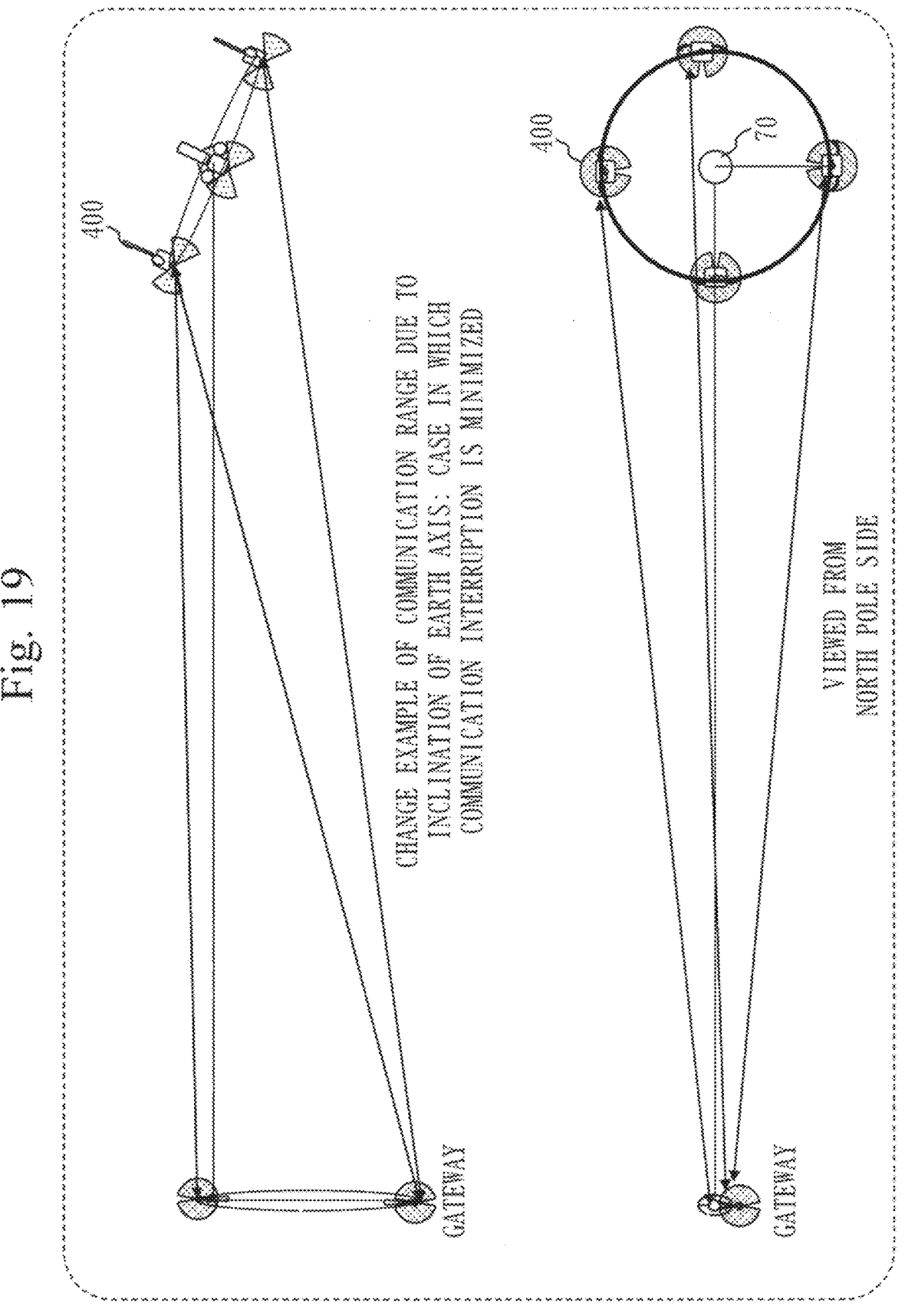
FIG. 19 is a diagram illustrating an example of transmission of a positioning signal using the positioning satellite according to Embodiment 6.

FIG. 19 is a diagram illustrating an example of transmission of the positioning signal 21 using the positioning satellite 400 according to the present embodiment.

The positioning satellite 400 flies in a stationary orbit or a quasi-zenith orbit.

In the positioning satellite 400, the X axis in the satellite coordinate system is taken as an east-facing traveling direction, the Y axis is taken as a south direction, and the Z axis is taken as an earth direction.

The positioning satellite 400 has a solar battery paddle 401 configured of one north-face (−Y) wing. Also, the positioning satellite 400 has the positioning-signal transmission device 10 mounted on the south face (+Y).

The positioning satellite 400 has a positioning-signal transmission field of view about the south-north axis (Y axis) from a counter-earth direction (−Z axis) to cover Azimuth ±170 deg and a positioning-signal transmission field of view equal to or larger than Elevation −25 deg (north side) and equal to or larger than Elevation 36 deg (south side) with respect to an XZ plane.

In NRHO, since the normal vector on the orbital plane is oriented to the earth direction, the positioning satellite can communicate with the gateway without being hidden by the shadow of the moon. On the other hand, in the earth stationary orbit satellite, transmission of positioning signals is interrupted in a season and a time zone when the positioning satellite is hidden by the shadow of the earth with respect to the moon.

Since the earth axis is inclined at approximately 23.4 degrees with respect to the inertial space, a fluctuation at ±23.4 degrees in the directivity direction occurs between the winter solstice and the summer solstice.

While the earth radius is approximately 6400 km, the stationary orbital radius is approximately seven times, approximately 42000 km, and the earth axis is inclined. Thus, depending on the season, a situation can be such that the shadow of the earth does not occur.

Thus, to minimize interruptions of transmission of positioning signals while the positioning satellite orbits around the earth once above the equator, a positioning-signal transmission device that rotates a view field direction about the south-north axis of the satellite is adopted. To eliminate view field interference on the satellite, the positioning-signal transmission device is mounted on a satellite south face where a wide field of view can be ensured on an apogee side of NRHO and, by changing biaxial orientation directions of Azimuth and Elevation, a positioning signal transmission view field with the gateway is ensured.

As a driving range of the positioning-signal transmission device, if the positioning-signal transmission device cannot successively rotate at a degree equal to or more than 360 degrees, a dead zone is allocated to the earth direction, and ±170 deg is covered with respect to the counter-earth direction as an Azimuth rotation range when the positioning-signal transmission device is mounted on the south face. The positioning-signal transmission device at ±175 deg is actually present, and the interruption time of transmission of positioning signals can be reduced as the field of view is wider.

Also, while the gateway is hidden by the shadow of the earth, the Azimuth directivity angle is set at the easternmost end, and after shadowing is over, a communication link is formed, and the Azimuth directivity angle is rotated to the westernmost end while the positioning satellite orbits around the earth approximately once. Thus, operation of setting the Azimuth directivity angle at the easternmost end after shadowing starts again is repeated.

The distance between the earth and the moon is approximately 385000 km, the height of apogee of NRHO is approximately 75000 km, and the height of perigee thereof is approximately 4000 km. Thus, an angle at which the perigee above the North Pole of NRHO is looked from the positioning satellite is 1 deg or smaller to an Elevation north latitude direction with respect to a satellite XZ plane, and an angle at which the apogee above the South Pole is looked therefrom is 12 deg or smaller to an Elevation south latitude direction with respect to a satellite Z axis (earth direction), where the X axis in the satellite coordinate system is taken as an east-face traveling direction, the Y axis is taken as a south direction, and the Z axis is taken as an earth direction.

In consideration of the fluctuation of approximately 23.4 deg in the inclination of the earth axis, a directivity-direction changing function with 25 deg or larger in the Elevation north latitude direction and 36 deg or larger in the Elevation south latitude direction is provided. With this, communication is always possible in a flying route from the apogee to the perigee of the gateway.

In the gateway, crewed activities are planned. In an event such as an extravehicular activity involving human life, an effect is brought in which communications can be made with a ground facility without communication interruption for a long period of time.

Note that when the perigee of NRHO is set on a south pole side of the moon, it goes without saying that the positioning satellite is arranged with south and north being exchanged.

Also, even if the orbit of the gateway is changed in the course of operation, operation with south and north being exchanged by rotating the positioning satellite by 180 degrees about the Z axis can be made, and an effect similar to the above can be obtained.

According to the positioning satellite 400 of the present embodiment, in Example 2 to Example 8 of the positioning method, an effect is brought in which it is possible to achieve a stationary satellite or a quasi-zenith satellite including a positioning-signal transmission device equipped with a directivity-direction control function while compensating for a change in the attitude of the stationary satellite or the quasi-zenith satellite with the rotation of the earth.

Each system, each satellite, each station, and each device described in Embodiments 1 to 6 above include a computer, and the computer is used to implement the functions described in Embodiments 1 to 6.

The computer includes a processor or an electronic circuit, and also includes other pieces of hardware such as a memory, an auxiliary storage device, an input interface, an output interface, and a communication device. The processor or the electronic circuit is connected to the other pieces of hardware via signal lines to control the other pieces of hardware.

In Embodiments 1 to 6 described above, the structures of each system, each satellite, each station, and each device may not be as the structures in the embodiments described above. The structures of each system, each satellite, each station, and each device may be any as long as the functions described in Embodiments 1 to 6 above can be implemented.

Also, among Embodiments 1 to 6, a plurality of portions or examples may be implemented as combined. Alternatively, among these embodiments, one portion or example may be implemented. In addition, these embodiments may be implemented as combined as a whole or partially in any manner.

That is, in Embodiments 1 to 6, a free combination of the respective embodiments, or a modification of any component in each embodiment or an omission of any component in each embodiment can be made.

Note that the above-described embodiments are intrinsically preferable examples and are not intended to limit the scope of the present disclosure, the scope of application of the present disclosure, and the scope of use purposes of the present disclosure. The above-described embodiments can be variously changed as required.

REFERENCE SIGNS LIST

10: positioning-signal transmission device; 21: positioning signal; 30: satellite; 31: satellite control device; 32: satellite communication device; 33: propulsion device; 34: attitude control device; 35: power supply device; 70: earth; 71: moon; 100: ground station; 200: stationary satellite; 300: quasi-zenith satellite; 400: positioning satellite; 401: solar battery paddle; 500: flying object; 510: first flying object; 520: second flying object; 530: third flying object; 550: lunar surface station; 501: positioning-signal reception device; 502: measuring device; 503: high-precision clock; 800: positioning system; 801: lunar positioning system

The invention claimed is:

1. A positioning method of measuring position coordinates of a flying object flying in an outer space from the earth to the moon or a planet or near the moon or a planet, wherein the flying object
   includes a high-precision clock and a positioning-signal reception device, and
   measures position coordinates in an earth-fixed coordinate system by receiving a positioning signal transmitted from a stationary satellite that includes a positioning-signal transmission device and has known position coordinates in the earth-fixed coordinate system and a positioning signal transmitted from a quasi-zenith satellite that includes a positioning-signal transmission device and has known position coordinates in the earth-fixed coordinate system, simultaneously from any three of said stationary satellites and said quasi-zenith satellites.

2. A positioning method of measuring position coordinates of a flying object flying in an outer space from the earth to the moon or a planet or near the moon or a planet, wherein the flying object
   includes a positioning-signal reception device, and
   measures position coordinates in an inertial coordinate system by receiving a positioning signal transmitted from a stationary satellite that includes a positioning-signal transmission device and has known position coordinates in an earth-fixed coordinate system or the inertial coordinate system and a positioning signal transmitted from a quasi-zenith satellite that includes a positioning-signal transmission device and has known position coordinates in the earth-fixed coordinate system or the inertial coordinate system, simultaneously from any three or more of said stationary satellites and said quasi-zenith satellites.

3. A positioning method for a positioning system of measuring position coordinates of a second flying object flying in an outer space from the earth to the moon or a planet or near the moon or a planet and including a positioning-signal reception device, wherein
   the positioning system is configured of
   a first flying object including a high-precision clock, a positioning-signal reception device, and a positioning-signal transmission device,
   a stationary satellite including a positioning-signal transmission device and having known position coordinates in an earth-fixed coordinate system or an inertial coordinate system, and
   a quasi-zenith satellite including a positioning-signal transmission device and having known position coordinates in the earth-fixed coordinate system or the inertial coordinate system, the first flying object measures position coordinates in the earth-fixed coordinate system or the inertial coordinate system by receiving positioning signals simultaneously from any three or more of said stationary satellites and said quasi-zenith satellites, and transmits a positioning signal as a flying object with known position coordinates, and the second flying object measures position coordinates in the earth-fixed coordinate system or the inertial coordinate system by receiving positioning signals simultaneously from the first flying object and any three of said stationary satellites and said quasi-zenith satellites.

4. A positioning method for a positioning system of measuring position coordinates of a second flying object flying in an outer space from the earth to the moon or a planet or near the moon or a planet and including a positioning-signal reception device, wherein the positioning system is configured of a first flying object including a positioning-signal transmission device, orbiting around the moon, and having known position coordinates in a moon-fixed coordinate system or an inertial coordinate system, a stationary satellite including a positioning-signal transmission device and having known position coordinates in the inertial coordinate system, and a quasi-zenith satellite including a positioning-signal transmission device and having known position coordinates in the inertial coordinate system, and the second flying object measures position coordinates in the inertial coordinate system by receiving positioning signals simultaneously from the first flying object and any three of said stationary satellites and said quasi-zenith satellites.

5. A positioning method for a positioning system of measuring position coordinates of a second flying object flying in an outer space from the earth to the moon or a planet or near the moon or a planet and including a positioning-signal reception device, wherein the positioning system is configured of a lunar surface station installed on a lunar surface, including a high-precision clock and a positioning-signal transmission device, and having known position coordinates in a moon-fixed coordinate system or an inertial coordinate system, a stationary satellite including a positioning-signal transmission device and having known position coordinates in the inertial coordinate system, and a quasi-zenith satellite including a positioning-signal transmission device and having known position coordinates in the inertial coordinate system, and the second flying object measures position coordinates in the inertial coordinate system by receiving positioning signals simultaneously from the lunar surface station and any three of said stationary satellites and said quasi-zenith satellites.

6. A positioning method for a positioning system of measuring position coordinates of a second flying object flying in an outer space from the earth to the moon or a planet or near the moon or a planet and including a positioning-signal reception device, wherein the positioning system is configured of a lunar surface station installed on a lunar surface, including a high-precision clock and a positioning-signal transmission device, and having known position coordinates in a moon-fixed coordinate system or an inertial coordinate system, a first flying object including a positioning-signal transmission device, orbiting around the moon, and having known position coordinates in the moon-fixed coordinate system or the inertial coordinate system, a stationary satellite including a positioning-signal transmission device and having known position coordinates in the inertial coordinate system, and a quasi-zenith satellite including a positioning-signal transmission device and having known position coordinates in the inertial coordinate system, and the second flying object measures position coordinates in the inertial coordinate system by receiving positioning signals simultaneously from the lunar surface station, the first flying object, and any two of said stationary satellites and said quasi-zenith satellites.

7. A lunar positioning system configured of both or one of a lunar surface station installed on a lunar surface, including a high-precision clock and a positioning-signal transmission device, and having known position coordinates in a moon-fixed coordinate system, and a third flying object including a high-precision clock and a positioning-signal transmission device, orbiting around the moon, and having known position coordinates in the moon-fixed coordinate system, wherein a total number of said lunar surface stations and said third flying objects is four or more.

* * * * *